United States Patent
Arbuckle

(10) Patent No.: US 7,989,575 B2
(45) Date of Patent: *Aug. 2, 2011

(54) PHENOL-FORMALDEHYDE RESOLE RESINS, METHOD OF MANUFACTURE, METHODS OF USE, AND ARTICLES FORMED THEREFROM

(75) Inventor: Stephen W. Arbuckle, Louisville, KY (US)

(73) Assignee: Momentive Specialty Chemicals Inc., Columbus, OH (US)

( * ) Notice: Subject to any disclaimer, the term of this patent is extended or adjusted under 35 U.S.C. 154(b) by 663 days.

This patent is subject to a terminal disclaimer.

(21) Appl. No.: 11/956,662

(22) Filed: Dec. 14, 2007

(65) Prior Publication Data

US 2008/0097041 A1    Apr. 24, 2008

Related U.S. Application Data

(63) Continuation-in-part of application No. 11/248,105, filed on Oct. 12, 2005, now Pat. No. 7,323,534.

(60) Provisional application No. 60/619,391, filed on Oct. 15, 2004.

(51) Int. Cl.
*C08G 14/02* (2006.01)
*C08G 14/00* (2006.01)

(52) U.S. Cl. ........ 528/129; 528/164; 528/254; 525/484; 525/489; 525/495; 525/497; 525/498; 524/541

(58) Field of Classification Search ............... 528/129, 528/164, 254; 525/484, 489, 495, 497, 498; 524/541

See application file for complete search history.

(56) References Cited

U.S. PATENT DOCUMENTS

| | | | |
|---|---|---|---|
| 4,757,108 A | 7/1988 | Walisser | |
| 5,300,562 A | 4/1994 | Coventry et al. | |
| 6,114,491 A | 9/2000 | Dupre et al. | |
| 6,379,814 B1 | 4/2002 | Dupre et al. | |
| 6,646,094 B1 | 11/2003 | Malhotra et al. | |
| 6,706,809 B2 | 3/2004 | Tutin et al. | |
| 6,706,845 B2 | 3/2004 | Ingram et al. | |
| 7,323,534 B2 * | 1/2008 | Arbuckle | 528/129 |
| 2004/0029999 A1 | 2/2004 | Muller et al. | |

OTHER PUBLICATIONS

Tomita, Bunichior et al., Synthesis of Phenol-Urea-Formaldehyde Cocondensed Resins from UF-Concentrate and Phenol, Holzforschung, 522-526, vol. 48 (1994) No. 6.

* cited by examiner

*Primary Examiner* — Duc Truong

(57) ABSTRACT

A composition is disclosed, which comprises a hydroxyaromatic-aldehyde resole resin comprising an aldehyde and a hydroxyaromatic compound, modified with a urea-aldehyde condensate. The hydroxyaromatic-aldehyde resole resin is prepared without ammonia or a primary amine and the composition does not contain a triazone or a substituted triazone compound. The composition has improved premix stability, improved cure efficiency, comparable tensile strength, and lower volatiles than the hydroxyaromatic-aldehyde resole resin unmodified with a urea-aldehyde condensate. Also disclosed are articles prepared therefrom.

20 Claims, No Drawings

PHENOL-FORMALDEHYDE RESOLE RESINS, METHOD OF MANUFACTURE, METHODS OF USE, AND ARTICLES FORMED THEREFROM

RELATED APPLICATION DATA

This application is a continuation in part of U.S. application Ser. No. 11/248,105, filed Oct. 12, 2005 now U.S. Pat. No. 7,323,534, which claims the benefit of U.S. Provisional Application Ser. No. 60/619,391 filed Oct. 15, 2004, the entire contents of which are hereby incorporated by reference.

BACKGROUND

This disclosure relates to hydroxyaromatic-aldehyde resole resins, their preparation, use, and articles formed therefrom.

Hydroxyaromatic-aldehyde resole resins, and in particular phenol-formaldehyde resole resins, are of utility in a wide range of applications due to their excellent physical properties, including their durability, water resistance, bond strength, and the like, as well as their low cost and ease of manufacture and use. Phenol-formaldehyde resole resins have accordingly been used in the manufacture of products as diverse as laminates, consolidated wood products, and fiberglass insulation materials.

While a wide variety of hydroxyaromatic-aldehyde resole resins have been developed and are suitable for their intended purposes, environmental and industry standards demand ever-increasing improvement in both environmental compliance and physical properties of the resins. Reduction in aldehyde (particularly formaldehyde) emissions has proved particularly difficult without significantly adversely affecting the advantageous properties of the resins, cost, and/or manufacturing time. For example, formaldehyde scavengers such as urea, ammonia, melamine, various primary and secondary amines, dicyandiamide, and other amino-based modifications have been added to resoles. These are typically post-added to the resin or at the customers' plant, resulting in low efficiencies. Post-addition of urea can cause trimethylamine odors, which arises from incomplete reaction of urea. Post-addition of ammonia as a scavenger can lead to lower water dilutability, unwanted precure, and ammonia odor.

Other approaches to reduction of formaldehyde emissions include post-addition of a cyclic urea prepolymer, as described in U.S. Pat. No. 6,114,491, which is prepared utilizing ammonia or a primary amine and contains at least 20% triazone compounds. The triazone compounds being derived from the reaction of urea with formaldehyde and the ammonia or primary amine. The urea-aldehyde condensate of the present invention differs from that described in U.S. Pat. No. 6,114,491 in that it is not prepared utilizing ammonia or a primary amine, and therefore does not contain triazone or a substituted triazone compounds.

A process of reacting a first amino-based scavenger under acidic conditions and a second amino-based scavenger at neutral or slightly basic conditions is described in U.S. Pat. No. 4,757,108. A process requiring adding ammonia, preferably at the site of the resin manufacturer, before the addition of urea, is described in U.S. Pat. No. 5,300,562.

There nonetheless remains a need in the art for improved compositions for use as binders for the manufacture of insulation, for example fiberglass insulation. Such binders are typically low molecular weight, phenol-formaldehyde resoles together with formaldehyde scavengers, acid catalysts, and coupling agents. Acid cure has been favored in the art because it produces a glass fiber insulation having good strength and moisture resistance characteristics. The most common scavengers are chemical species containing a primary or secondary amine functionality, for example urea, ammonia, melamine, and dicyandiamide. When urea is used as the formaldehyde scavenger, the amount of urea added to the resin is referred to as the extension level, which is reported as a percent of the binder solids. Binder solids consist of phenol-formaldehyde resole resin solids and extender solids.

The addition of formaldehyde scavengers to a phenol-formaldehyde resole resin requires a finite period of time to achieve equilibrium with the free formaldehyde in the resin. The process of reaching this equilibrium is referred to as pre-reaction, and the time to reach the equilibrium is referred to as the pre-react time. Pre-react times vary with temperature and amine species. When urea is used, the pre-react times range from 4 to 16 hours depending on temperature. Use of urea can also adversely affect the mole ratio of formaldehyde to urea in the binder, which is optimally maintained between 0.8 and 1.2. If the extension level results in a formaldehyde-urea ratio of less than 0.8, the opacity increases significantly along with the ammonia emissions. If the extension level results in a formaldehyde-urea ratio greater than 1.2, formaldehyde emissions increase and the risk of precipitation of dimethylolurea is greatly increased.

There are other disadvantages to pre-reacting resins with urea prior to forming the binder. Because free formaldehyde improves the solubility of phenol-formaldehyde tetradimer, or methylene bis-(4-(2,6-dimethylolphenol)), in the resin, pre-reacting with urea will reduce the percent of free formaldehyde in the resin, hence reducing resin tetradimer solubility over time. Further, long pre-react times, as observed when urea is used as the formaldehyde scavenger, shorten the shelf life of the binder.

There is accordingly a need for hydroxyaromatic-aldehyde resole resins and methods that will lower phenol and aldehyde (particularly formaldehyde) emissions from phenol-formaldehyde resole resins while maintaining or improving premix stability, cure efficiency, and/or advantageous physical properties such as moisture resistance, tensile strength, and compression recovery.

SUMMARY OF THE INVENTION

The above-described drawbacks and disadvantages of the prior art are alleviated by a composition comprising a hydroxyaromatic-aldehyde resole resin comprising the reaction product of an aldehyde and a hydroxyaromatic compound, modified with a urea-aldehyde condensate. The urea-aldehyde condensate, as well as the resulting hydroxyaromatic-aldehyde resole resin, is substantially free of triazone compounds, which compounds may or may not be substituted, because ammonia or a primary amine is not utilized in the preparation of the condensate.

In another embodiment, a composition comprises a hydroxyaromatic-aldehyde resole resin modified with about 1 to about 40% by weight of solids of the urea-aldehyde condensate.

In another embodiment, a method of making modified hydroxyaromatic-aldehyde resole resin comprises combining a urea-aldehyde condensate which is substantially free of a triazone compound, with a hydroxyaromatic-aldehyde resole resin at a time prior to the use of the hydroxyaromatic-aldehyde resole resin in a process for the manufacture of an article therefrom.

In another embodiment, a method of manufacture of an article comprises contacting a composition comprising a hydroxyaromatic-aldehyde resole resin modified with a urea-aldehyde condensate which is substantially free of a triazone compound, to fibers; and curing the composition on the fibers.

In another embodiment, the present invention is further directed articles comprising the hydroxyaromatic-aldehyde resole resin modified with urea-aldehyde condensate which is substantially free of a triazone compound, and fibers. In a further embodiment, the article is an insulation product.

DETAILED DESCRIPTION OF THE INVENTION

This invention describes the manufacture of a modified hydroxyaromatic-aldehyde resin that has low emissions, improved stability, and efficiency. The urea-aldehyde condensate, and the resulting modified hydroxyaromatic-aldehyde resin, are substantially free of triazone compounds, which compounds may or may not be substituted, because the condensate is prepared in the absence of ammonia or primary amine. By introduction of a urea-aldehyde condensate composition to a hydroxyaromatic-aldehyde resole resin, a modified resin can be made that emits low levels of aldehyde and hydroxyaromatic compound during processing and curing. Surprisingly, it has been found that water soluble, hydroxyaromatic-aldehyde resole resins having excellent physical properties and reduced emissions may be prepared by addition of a urea-aldehyde condensate during formation and/or use of the hydroxyaromatic-aldehyde resole resin. The resins are useful as binders for insulation materials.

As used herein, the term "condensate" refers to the condensation product of urea and an aldehyde, and may be used interchangeably with the term "urea-aldehyde condensate"; the terms "urea-formaldehyde concentrate" and "UF concentrate" are used to describe the specific condensate of urea and formaldehyde, and may be used interchangeably; the term "resin" refers to the reaction product of a hydroxy aromatic compound and an aldehyde, and which may contain co-reactant such as urea or dicyandiamide, but which does not comprise urea-aldehyde concentrate; the term "modified resin" refers to the reaction product of the resin (with or without co-reactants) and a urea-aldehyde condensate; the terms "premix" and "premix composition" refer to the combination (in solution) of a resin or modified resin with added urea, and may be used interchangeably; and the terms "binder" and "binder composition", which may be used interchangeably, refer to the combination of a premix with other additives such as, for example, filler and thermal acid generators.

In a particularly advantageous feature, premix compositions comprising the hydroxyaromatic-aldehyde resin modified with urea-aldehyde condensate have improved stability toward the precipitation of tetradimer or bis-(2,6-dimethylolphenol)methane. Tetradimer has a very low solubility in aqueous phenol-formaldehyde resole resin solutions especially during the premix stage as the tetradimer is stabilized by free formaldehyde. Addition of urea at about 25 wt % to about 45 wt % of phenol-formaldehyde solids as a formaldehyde scavenger and low-cost resin extender or filler can cause the precipitation of sufficient tetradimer to coat the mix tanks and coating equipment. In an initial, non-aged state, the premix solution is essentially transparent and a visible precipitate is absent. Precipitation of tetradimer may occur at room temperature (72-77° F.; 22-25° C.) and in a time frame of 24 hours or less under manufacturing conditions, and is evidenced by the formation of a visible or quantifiable haze in the binder solution. This precipitate leads to significant cleaning problems for resin solution handling equipment such as mix tanks, and particularly for spray application tools as the precipitate can cause the nozzles to become occluded, and the residues cannot be removed by rinsing with water. Further, tetradimer residues catalyze further precipitation of tetradimer from fresh phenol-formaldehyde solutions. Reducing the incidence of tetradimer precipitation is advantageous in manufacturing processes using phenol-formaldehyde resole resin as it in turn reduces both the need for cleaning and the resultant equipment down time. Thus, the premix composition remains free of visible haze for greater than about 48 hours at a temperature of about 22° C. to about 27° C.

In similar fashion, the premix compositions have improved stability toward the precipitation of dimethylolurea. In an initial, non-aged state, the premix solution is essentially transparent and a visible precipitate is absent. Dimethylolurea precipitates during cold storage (about 47° F.; about 8° C.) of a premix solution comprising about 63 wt % phenol-formaldehyde and about 37 wt % urea (as percent of solids) in as little as 15 hours with the unmodified phenol-formaldehyde-urea compositions, as evidenced by the formation of a visible or quantifiable haze in the premix solution. However, the present premix compositions comprising the phenol-formaldehyde resole resin solution and the urea-formaldehyde condensate, when combined in proportions of about 63 wt % of resin solids solution and about 37 wt % of urea solids solution, do not exhibit significant dimethylolurea precipitation until after 100 hours elapsed storage time Thus, in an embodiment, the premix composition remains free of visible haze for greater than 36 hours at a temperature of about 9 to about 10° C. In another embodiment, no precipitate forms in the premix composition for at least 72 hours at a temperature of about 9 to about 10° C.

Another advantageous feature is the greater efficiency observed in the conversion of low MW components of the present premix compositions to form cured resin. Improved resin efficiency test results for the modified resin system have been found to be indicative of lower levels of emissions during the cure when compared with the unmodified system.

The urea-aldehyde condensate is formed by the reaction of urea and a reactive aldehyde under alkaline conditions. The urea may be derived from a variety of commercially available forms, for example solid urea, such as prill, and aqueous urea solutions. Other reactive aldehydes can be substituted in whole or in part for formaldehyde to produce the aqueous urea-aldehyde condensate composition. Examples of other reactive aldehydes that may be used include acetaldehyde, propionaldehyde, furfuraldehyde, glutaraldehyde, and benzaldehyde. Mixtures comprising at least one of the foregoing may also be used. Formaldehyde or mixtures comprising formaldehyde are preferred. The formaldehyde may be used in the form of a gas, a formalin solution (an aqueous solution of formaldehyde) in typical concentrations of about 37% to about 60% by weight, as paraformaldehyde (solid, polymerized formaldehyde), or as a mixture comprising any of the foregoing. The aldehyde is typically used in an amount of about 0.1 to about 2.0 moles per mole of phenol as calculated using the aldehyde content of the urea-aldehyde condensate, with the optimal ranges being dependent on the particular application.

The relative amounts of formaldehyde, urea, and water used to form the urea-aldehyde condensate and effective times and temperature for reaction will depend on the desired concentrations of formaldehyde, urea-aldehyde condensate composition, and water in the condensate composition. These relative ratios will in turn depend on the type of phenol-formaldehyde resole resins used and the desired end properties of the resin. In general, the urea-aldehyde condensate may comprise about 0.1 to about 50 wt %, specifically about 10 to about 30 weight percent, more specifically about 20 to about 25 wt % free formaldehyde; about 20 to about 90 wt %, specifically about 50 to about 75 wt %, mores specifically about 60 to about 65 wt % urea-formaldehyde; and about 5 to about 60 wt %, specifically about 8 to about 35 wt %, more specifically about 12 to about 18 wt % water.

In one embodiment, the urea-formaldehyde condensate comprises urea, formaldehyde, and water. A particular example is where the condensate comprises about 60 wt % formaldehyde, about 25 wt % urea, and about 15 wt % water. In another example, the condensate comprises about 50 wt % formaldehyde, about 21 wt % urea, and about 29 wt % water. In another example, the condensate comprises about 65 wt % formaldehyde, about 25 wt % urea, and about 10 wt % water. It will be appreciated by those skilled in the art that the formaldehyde content of the composition is distributed at least between formaldehyde reacted with the urea to form methylol groups, and free formaldehyde. The distribution ratio of these forms of the formaldehyde will be influenced by the ratios of formaldehyde, urea, and water, and additionally by reaction time, temperature, processing conditions such as the use of a vacuum strip or reflux, and concentration. A typical amount of free formaldehyde for a single embodiment may be about 20 wt % to about 25 wt % of the composition, specifically about 21 wt % to about 23 wt %. It will also be appreciated by one skilled in the art that additional variations of the ratio of formaldehyde, urea, and water, as well as variations in reaction conditions as described above, may be used, which will provide a condensate composition that acts within the scope of the present disclosure.

In general, these compositions may be obtained by mixing about 20 to about 80 wt %, specifically about 30 to about 70 weight percent, more specifically about 50 to about 65 wt % formaldehyde, about 5 to about 70 wt %, specifically about 15 to about 50 weight percent, mores specifically about 20 to about 40 wt % urea, and about 0.01 to about 1.0 wt %, specifically about 0.02 to about 0.5 weight percent, more specifically about 0.03 to about 0.4 wt % catalytic base in water at a temperature of about 40 to about 100° C., specifically about 75 to about 85° C. if processing in batch mode, for about 3 to about 10 hours depending on process.

The condensates may be prepared in a container such as a laboratory flask or plant reactor. Additionally, the urea-formaldehyde condensate composition may be prepared using a continuous flow process. Such a process may comprise adding gaseous formaldehyde, 50 wt % urea in aqueous medium, and a base catalyst to an absorber column. Water may be removed from the condensate composition during this process. Such urea-formaldehyde condensate compositions may also be obtained commercially. An example of a suitable urea-formaldehyde condensate is Casco® UF-85 concentrate from Hexion Specialty Chemical, Inc. (formerly Borden Chemical, Inc.). To those skilled in the art, it is understood the condensate can also be made with an acid, neutralized and added any time after the manufacture of the hydroxyaromatic-aldehyde resin.

The preparation of these condensates in the absence of ammonia or a primary amine results in a composition that is substantially free of triazone or substituted triazone compounds. As used herein, the absence of ammonia or primary amine means that no ammonia or primary amine is intentionally added, however, incidental amounts introduced or produced are not precluded. As used herein, substantially free of triazone or a substituted triazone compound means that no triazone or substituted triazone is intentionally introduced or produced, with incidental amounts not precluded. Specifically, the urea-aldehyde condensate has less than about 15%, more preferably less than about 10. %, more preferably less than about 5 wt. %, more preferably less than about 2 wt. %, and even more preferably less than about 1% triazone or a substituted triazone.

The urea-aldehyde condensate is used with a phenol-formaldehyde resole resin. Phenol-formaldehyde resole resins may be prepared by the reaction of a hydroxyaromatic compound, for example phenol, with a molar excess of an aldehyde or aldehyde condensate composition, for example formaldehyde, under alkaline reaction conditions. For convenience, all such resins are referred to herein as "phenol-formaldehyde resole resins." Thus, other hydroxyaromatic compounds can be used, or used in addition to phenol. Examples of substituted phenols that can be used include alkyl-substituted phenols such as o-cresol, m-cresol, p-cresol, 3,5-xylenol, 3,4-xylenol, 3,4,5-trimethyl phenol, 3-ethyl phenol, 3,5-diethyl phenol, p-butyl phenol, 3,5-dibutyl phenol, p-amyl phenol, p-octyl phenol, and the like; cycloalkyl-substituted phenols such as p-cyclohexyl phenol, 3,5-dicyclohexyl phenol, and the like; alkenyl-substituted phenols; aryl-substituted phenols such as p-phenyl phenol; alkoxy-substituted phenols such as 3,5-dimethyoxyphenol, p-ethoxy phenol, p-butoxy phenol, 3,4,5-trimethoxyphenol, and the like; aryloxy phenols such as p-phenoxy phenol; halogen-substituted phenols such as p-chlorophenol; and polycyclic phenols such as naphthol, anthranol, and substituted derivatives thereof. Similarly, dihydric phenols such as catechol, resorcinol, hydroquinone, bisphenol A and bisphenol F can be used. Mixtures comprising at least one of the foregoing hydroxyaromatic compounds may be used. Phenol itself is preferred, as well as, mixtures which include phenol.

Additionally, nitrogenous compounds with crosslinkable functional sites may be used either in combination with the hydroxy-functionalized aromatic compounds described above. Examples of such nitrogenous compounds with a suitable reactivity include amines such as ethylenediamine, propylenediamine, 1,3-pentanediamine, 1,4-butanediamine, 1,5-pentanediamine, 1,6-hexanediamine, bis-(2-aminoethyloxy)ethylene, melamine, urea, dicyandiamide, and cyclic ureas such as ethyleneurea, propyleneurea, trimethyleneurea, and glycouril, or a combination comprising at least one of these. Preferred nitrogenous compounds include urea, dicyandiamide, melamine, or a composition comprising at least one of these. The nitrogenous compounds can be added at any time during the resin reaction. It has been found that the addition of urea or dicyandiamide prior to the addition of the urea-formaldehyde concentrate but after the condensation reaction of the phenol and formaldehyde has proceeded to a point at which about two-thirds to about three-fourths of the condensation reaction has been complete, produces a final product with high solids and good storage stability Typically, where used, the amount of nitrogenous compound present is 3 to 45 percent by weight of the total resin solids.

Similarly, other reactive aldehydes as described above can be substituted in whole or in part for formaldehyde to produce the aqueous solution of water-soluble resole resin. Formaldehyde or mixtures comprising formaldehyde are preferred. The formaldehyde may be used in the form of a gas, a formalin solution with typical concentrations of about 37 to about 60 wt % of formaldehyde, and/or paraform (paraformaldehyde, or solid, polymerized formaldehyde).

It is to be understood that while the terms "phenol" and "formaldehyde" may be used in the following description for convenience, the discussion also applies to other hydroxyaromatic compounds, reactive aldehydes, and mixtures as described above.

Alkaline reaction conditions may be established by adding an alkaline catalyst to an aqueous solution of the phenol and/or phenol and formaldehyde reactants. Suitable alkaline catalysts include those known in the art for the manufacture of resole resins, and include, for example, alkali and/or alkaline earth metal hydroxides such as lithium hydroxide, sodium hydroxide and potassium hydroxide; alkaline earth metal oxides such as lime; alkali metal carbonates such as sodium carbonate and potassium carbonate; and certain amines. Based on considerations of cost and availability, sodium hydroxide and/or potassium hydroxide is used most often.

The urea-aldehyde condensate may be combined with the hydroxyaromatic-aldehyde resole resin at any point during, after, or both during and after the process of manufacture and used as described in more detail below. The point in the process for addition of the condensate is dependent upon the amount of formaldehyde present in the resole, the amount of the condensate composition to be added, and is considered in view of the desired molecular weight of the final resin and the amount of free phenol and free formaldehyde desired. It is within the skill of one versed in the art to determine the appropriate point of introduction of the condensate composition.

In a typical process for the manufacture of hydroxyaromatic-aldehyde resole resins, one embodiment, an initial aqueous reaction mixture may be prepared by first combining a hydroxyaromatic compound and a basic polymerization catalyst in an aqueous solution. The aldehyde is then added to form the initial aqueous reaction mixture. Alternatively, the initial aqueous reaction mixture may be prepared by mixing a hydroxyaromatic compound and an aldehyde, followed by addition of a basic catalyst for the polymerization.

In either case, sufficient reactive aldehyde is used to provide an initial mole ratio of reactive aldehyde to hydroxyaromatic compound of about 2.0:1 to about 6.0:1; more specifically about 2.75:1 to 5.0:1; still more specifically about 3.0:1 to 4.75:1 as calculated when omitting the contribution of formaldehyde from the condensate.

Effective amounts of alkaline catalyst are known to those skilled in the art. Typically, at least about 0.005 mol of alkaline catalyst per mol of phenol is used, specifically an amount between about 0.01 and 1 mol of alkaline catalyst per mol of phenol, depending on the application. All of the catalyst can be added initially or the catalyst can be added incrementally in two or more additions or continuously over a defined time period. Use of a relatively high level of catalyst may reduce residual monomers and simultaneously minimize the proportion of high molecular weight species in the product. High molecular weight species undesirably reduce the water solubility of the resin product and reduce its storage stability. For example, the amount of catalyst may be about 0.01 mol to about 0.60 mol, specifically about 0.05 mol to about 0.40 mol of catalyst per mol of hydroxyaromatic compound.

After completion of the addition of the aldehyde to the hydroxyaromatic compound and base catalyst, the temperature of the first aqueous reaction mixture is maintained within a range effective to complete methylolation and effect condensation, until a predetermined endpoint is achieved. The temperature is preferably maintained sufficiently high so that the condensation reaction can occur rapidly, without significant buildup of molecular weight. The temperature of the first aqueous reaction mixture may, for example, be maintained at about 50° C. to about 75° C.; more specifically at about 55° C. to about 70° C.; still more specifically at about 60° C. to about 65° C. In this way, the hydroxyaromatic compound and aldehyde are condensed to form a hydroxyaromatic-aldehyde resole resin.

The endpoint can be determined by an analytical technique that samples the extent of condensation, for example gel permeation chromatography (GPC) or saltwater tolerance as referred to in U.S. Pat. No. 6,646,094. Test Description: A 25% sodium chloride solution is prepared and held at 25° C. A sample of resin to be tested is weighed into a test tube. The weight of the sample is recorded. The test tube containing the resin is cooled to 25° C. as well. The 25% sodium chloride solution is slowly added to the resin while agitating until a distinct change occurs. The contents will remain cloudy or turbid. The test tube containing resin and salt solution is reweighed. The percent saltwater tolerance is calculated by finding the difference between the final weight and the sample weight, dividing by the sample weight, and multiplying the result by 100. The results indicate the how far advanced the resin is at the time of sampling.

In one embodiment, the urea-aldehyde condensate is added to the reaction product at a time after the condensation endpoint is reached, but prior to the application of the resole to the fibrous mass in a manufacturing process.

The amount of urea-aldehyde condensate added to the hydroxyaromatic-aldehyde resole resin will depend on the types and ratios of starting materials, as well as the desired resin properties. Typical amounts may be about 0.1 wt % to about 30 wt %, specifically about 1 wt % to about 20 wt %, more specifically about 5 wt % to about 15 wt %, based on the liquid resin. During and after addition of the urea-aldehyde condensate, the reaction is continued at a temperature and for a time effective to blend and/or further condense the resin and the condensate composition. Effective temperature and times will depend upon the types and ratios of starting materials, as well as the desired resin properties. In general, this portion of the process may be conducted about 20° C. to about 80° C., specifically about 35 to about 60° C., for about 5 minutes to about 12 hours, specifically about 20 minutes to about 6 hours, more specifically about 20 min. to about 60 min. Typically, after reacting, the hydroxyaromatic-aldehyde resole resin modified with urea-aldehyde condensate may have a free hydroxyaromatic compound (e.g., free phenol) content after condensation of less than or equal to 2%, specifically less than or equal to 0.75%, more specifically less than or equal to 0.5%, and still more specifically less than or equal to 0.4%, based on the amount of resin solids.

Once preparation of the urea-aldehyde condensate-modified resole resin is complete, the mixture is cooled, for example to a temperature of about 20° C. to about 30° C. The aqueous resin can be used directly, or packaged, as by drumming, and stored until needed or transferred to a site of intended use. Storage conditions are about 12° C. to about 22° C., and are similar to the conditions for resins that are not so modified. Because the urea is pre-reacted with the formaldehyde prior to addition to the hydroxyaromatic-aldehyde resole resin, the urea is more readily and completely reacted. Also, since urea is a low cost component, there is commercial advantage in urea-modified hydroxyaromatic-aldehyde resole resins that perform similarly to unmodified hydroxyaromatic-aldehyde resole resins. Secondly, since less water is added to the reaction mixture, less, if any, is required to be removed by distillation. As a third consideration, the polymerization reaction proceeds more readily at this higher solids content. Additionally, the higher solids compositions can be delivered at lower freight costs to the customer.

The resulting phenol-formaldehyde resole resin can be used to prepare a premix composition for a variety of applications, including insulation materials and products. To make the completed binder, other components, such as a catalyst or latent cure catalyst, and other additives can be added to the aqueous mixture of the resole resin. Latent catalysts neutralize the alkalinity of the base resin upon heating and lower the pH to give an acid cure. Typical amounts are at least about 2 wt %, preferably about 3 wt % to about 10 wt %, based on the weight of binder solids. Suitable latent catalysts include ammonium sulfate (($NH_4$)$_2SO_4$) and the like. Such components may be added to the aqueous mixture of resole resin shortly before use.

In one embodiment, hydroxyaromatic-aldehyde resole resin is used as a binder in the manufacture of insulation products, such as fiberglass or mineral wool insulation. Typically, in such articles, the mineral fibers, such as glass fibers, are initially formed into a non-woven mat. An aqueous binder including the resole resin is typically sprayed on newly formed, still hot, glass fibers in a forming chamber or like apparatus to yield a wool-like mass including the glass fibers, bound by the resin binder. For some applications, it may be desirable to weave the fibers or otherwise form a fabric from the fibers.

Typically, for the manufacture of binders for fibrous mats such as, for example, insulation, a phenol-formaldehyde resole resin may be prepared with a mole ratio of about 2.0 mol to about 6.0 mol formaldehyde per mole phenol, and an alkaline catalyst level of about 0.025 mol to 0.40 mol catalyst per mole phenol. The free formaldehyde is typically between about 4 and about 17%. The resins comprise about 30 wt % to about 70 wt % solids, specifically about 40 wt % to about 55 wt % solids. For insulation-type applications, the urea-aldehyde condensate may be incorporated into the phenol-formaldehyde resole resin either during, after, or both during and after manufacture of the resin as described above, or when added during the application of the binder to the fiber during the manufacture of the insulation.

As is known, a drawback of insulation binders is the formation of precipitate upon induction of the urea and resin premix. This premix typically is prepared at the manufacturing site using a ratio per weight of solids of the modified resin to urea of 99:1 to 40:60. In an embodiment, a suitable premix has a ratio of modified resin to urea of 75:25 to 50:50, specifically 72:28 to 55:45 and more specifically 70:30 to 60:40. It will be appreciated by one skilled in the art that the amount of urea used to make the premix can vary widely depending upon the intended use. Solutions of the modified resin and urea are typically mixed to provide the premix as a solution having a solids level of 5 to 40% of the total weight of the solution. The premix solution is typically allowed to mix and induct for 8-24 hours prior to preparation of the binder, in order to react the free formaldehyde content of the resin with the urea, thus making a lower odor, more efficient and lower cost binder mix. The combination typically results in a free formaldehyde content of less than 0.5%. A precipitate may form as the induction time is completed or extended, which can result in lost non-volatiles, clogged filters and spray nozzles, disposal problems, shut-down of production lines, and frequent cleaning of the premix tank. This condition is further aggravated when the molecular weight of the resin is higher than typical and tetradimer is already present in the premix tanks. Addition of the urea-aldehyde condensate to the phenol-formaldehyde or urea-modified phenol-formaldehyde resole resin significantly alleviates precipitate formation, and at the same time reduces formaldehyde and phenol emissions when the same weight percent, based upon solids, of latent catalyst is used.

An exemplary process for manufacture of a binder resin for insulation in accordance with this embodiment comprises forming a first aqueous reaction mixture by combining the phenol and the basic catalyst (at least about 0.12 moles per mole of phenol), then feeding formaldehyde at an elevated temperature (e.g., 50-65° C.) over a 50-minute period. The formaldehyde:phenol ratio may vary from about 2.0:1 to about 6.0:1. The resin is maintained at this temperature for about 90 minutes, and then urea is charged to the reaction. This urea addition is optional and dependent upon the final free formaldehyde desired and the initial formaldehyde to phenol ratio. Condensation proceeds at about 62° C. to a projected endpoint having the desired free formaldehyde and phenol content. The mixture is cooled, for example to 40-45° C., and an amount of urea-aldehyde precursor composition is added to achieve the desired free formaldehyde content, about 1 wt % to about 5 wt % higher than the completed batch. The amount of condensate composition to be added is about 1 wt % to about 16 wt %, but can be higher depending on its composition and the amount of urea used in the premix. This mixture is mixed for about 30 min to about 40 min, at a temperature of about 40° C. to about 45° C., and then cooled.

Typical additives for these insulation binder applications include, for example, latent cure catalysts, mineral oil lubricants, dedusting oils, and coupling agents such as organosilane adhesion promoter. The binder may be prepared by combining and mixing the hydroxyaromatic-aldehyde resole resin with any desired additives. The binder typically contains about 0.5 wt % to about 95 wt % solids, specifically about 1 wt % to about 70 wt % solids, more specifically about 2 wt % to about 30 wt % solids. Water may be added as a diluent. Binders used for preparing insulation are generally very dilute, requiring water dilutability greater than 50:1.

The fibers may be in a variety of forms, for example, discontinuous or staple glass fibers cellulose, continuous or textile fibers, or other synthetic or natural materials. Continuous glass fibers may be used in the form of mats, or they may be chopped or cut to shorter lengths for mat or batt formation. Use can also be made of ultra-fine fibers formed by the attenuation of glass rods. Such fibers may be treated with a size, anchoring agent or other modify agent before use.

The binder may be applied to the fibers by known methods, such as by spraying onto the fibers, or by flooding a collected mat of fibers and draining off the excess, by applying the binder composition onto the fibers during mat formation, by spraying the glass fiber mat, or the like. The layer of fiber with binder may then compressed and shaped into the form and dimensions of the desired insulating product, and passed through a curing oven where the binder is cured to bond the mass of fibers one to another and form an integral composite structure. Cure is typically accomplished by heating at about 205° F. (96° C.) to about 400° F. (204° C.), specifically about 275° F. (135° C.) to about 375° F. (191° C.) for a time effective to cure the components. Cure time will depend at least partly on the cure temperature and the desired thickness of the product, and may be, for example, about 1 min to about 10 min.

The cured product generally comprises about 60 to about 99 wt % fibers and about 1 wt % to about 40 wt % binder, depending upon the density and character of the product. The cured product may further have a density of less than about 1 pound per cubic foot (less than about 0.015 grams per cubic centimeter, g/cc), up to about 30 to about 40 pounds per cubic foot (about 0.48 to about 0.64 g/cc) when molded or compressed products are made. The product may also be manufactured in the form of sheets as thin as about 0.25 (about 0.635 cm) to about 1.5 inch (about 3.81 cm), up to mats of about 12 (about 30 cm) to about 14 inches (about 35.6 cm) or more.

Emissions of hydroxyaromatics and aldehydes are lower for resole compositions containing a urea-formaldehyde condensate than for similar resole compositions which do not include a urea-formaldehyde condensate, under conditions of manufacturing articles. An example of such an article may be fiberglass insulation. A means of testing the emissions of a resole solution is found in the tube furnace emissions test. The test is used to determine the amount of phenol, formaldehyde, or ammonia, (ppm) emitted from hydroxyaromatic-aldehyde resole resins, and uses a positive gas flow, whether by use of a compressed nitrogen tank or vacuum, through the tube furnace to drive the emissions produced during a curing process to an impinger as it cures, hence releasing volatiles. The cure rate for the resin is controlled by programming the temperature ramp-up and hold times of the furnace. A typical method for determining quantities of volatiles produced by a curing sample is as follows: a) program the temperature controller to obtain 400° F. (204° C.) in 5 minutes, followed by a 10 min. hold at 400° F. (204° C.), then shut down after the 10 min hold; b). apply a minimum of 112 torr (25.5 inches of Hg) of vacuum to the tube furnace; c.) apply the already prepared binder composition to a suitable medium, such as a fiberglass filter disk available from Whatman Inc., and cut to a size for a suitable fit in the tube furnace; d.) weigh the amount of solution to be applied; e.) insert the sample into the tube furnace; f.) initiate the program described above to run the furnace cycle; g.) cool the tube furnace as rapidly as possible while taking care not to cause thermal cracking of the glass, typically about 15 minutes. The vapor thus produced is trapped in an impinger containing 150 mL of water. The water and vapor are transferred to another container and the impinger rinsed with 50 mL of water to capture any remaining volatiles. The solution is analyzed by a calorimetric method using a spectrophotometer to determine the concentrations of emission products present, and these results are converted to parts per million (ppm) using a calibration curve. Different hold times and temperatures may also be used.

The amount of residual phenol is determined according to the following procedure. Solution A is prepared by combining 10 g potassium tetraborate tetrahydrate, 2 g potassium hydroxide pellets, 0.25 g of 4-aminoantipyrine, 87.75 g of deionized water, and mixing the ingredients until dissolved. The pH is tested and adjusted to 10.3-10.7 using additional potassium hydroxide if necessary. Solution B is prepared by combining 0.2 g ammonium persulfate with 99.8 g of deionized water and mixing until the solids are dissolved. This solution is stable for 24 hours and so is prepared freshly. A Spec20 spectrophotometer is turned on 20 minutes prior to testing. A blank prepared with 5 mL deionized water, 2.5 mL of solution A, and 2.5 mL of solution B is mixed in a test tube and used to obtain a baseline scan in the spectrophotometer. A sample is prepared by combining 5.0 mL of the sample to be tested from the impinger, with 2.5 mL of solution A and 2.5 mL of solution B, mixing to ensure homogeneity, and allowing the freshly prepared sample to develop a stable color for 10 minutes prior to taking a spectrum. A blank absorbance reading is taken at 515 nm and the spectrophotometer is adjusted to 0 abs. The sample is then tested for absorbance at 515 nm, diluting if necessary to achieve an absorbance of about 0 to about 0.6. If dilution is necessary, the dilution amount is noted and the final concentration is calculated. Concentration values are obtained by comparison of the absorbance with a calibration plot previously prepared using known standard dilutions of phenol. This test is sensitive to phenolic monomers unsubstituted at the para-position; p-substituted phenolic monomers are not testable by this method.

Formaldehyde residuals are quantified according to the following procedure. Solution C is prepared by combining ammonium acetate (7.7 g) and deionized water (ca. 20 g), and acetyl acetone (0.1 g) in a 50 mL volumetric flask. The mixture is vigorously shaken to disperse the droplets of acetyl acetone, and then diluted to the 50 mL volumetric mark to complete the preparation of solution C. The Spec 20 spectrophotometer is reset to read at a wavelength of 413 nm, and a blank prepared from 5 mL of deionized water and 5 mL of solution C, mixed for 10-15 sec using a vortex mixer, is prepared. A sample is prepared using 5 mL of water from the impinger with 5 mL of solution C, and is mixed in a sample tube for 10-15 seconds using a vortex mixer. Both the sample and the blank are immersed in a water bath at 60° C.±1° C. for 10 minutes to develop any color, and subsequently cooled slowly to room temperature. The baseline absorbance is taken at 413 nm to zero the spectrophotometer, and the sample absorbance is also taken. The concentration values are obtained by comparison of the absorbance with a calibration plot using previously prepared and known standard dilutions of formaldehyde. These values can be expressed as ppm calculated to any base usage of the resin being tested and expressed as the quantity of phenol, formaldehyde, or ammonia emitted for comparative purposes. The charts herein express these values in the following manner: ppm in one litre=ppm in the impinger/sample size (1000).

Solids content as a percentage of the resin in solvent medium is the "pan solids", unless specifically referred to otherwise. Pan solids are determined generally by using a weighing pan, such as a stamped aluminum pan of about 5 cm diameter, with 0.5 to 1.0 cm sidewalls to contain liquid without spilling. A tare weight is obtained for the weighing pan, and an amount of a resin-containing liquid is weighed into the pan to give an initial weight of resin-containing liquid plus tare weight. The pan containing the liquid and resin is dried in an oven at sufficient temperature and for sufficient time to evaporate any volatile materials from the pan and produce a dried resin. The pan containing the dried, solid resin is then reweighed to obtain a final weight. The pan solids are then calculated by: subtracting the tare weight of the pan from the initial weight to determine the weight of liquid resin; subtracting the tare weight from the final weight to determine the solid resin weight; dividing solid resin weight by liquid resin weight, and multiplying by 100 to determine the % pan solids. This method is convenient but neglects the contributions of low molecular weight components in the liquid resin, which may further incorporate into the actual solids under conditions more closely approximating the application. A method for determining the contributions of volatile components under approximate conditions of process and application, herein referred to as resin efficiency, has been developed to define the contributions of volatile resin components.

Resin efficiency may be determined according to the following method. A reference medium comprising phenol-formaldehyde resole resin, and a second test medium comprising the phenol-formaldehyde resole resin modified with urea-formaldehyde condensate, are each prepared prior 16 hours prior to the test. The sample and reference are each diluted to 20% solids, and wt % ammonium sulfate is added to each and dissolved immediately prior to testing. Two filter media (Whatman 5.5 cm GF/F fiberglass filters, cat. No. 1825-055) are each suspended above aluminum pans using a paperclip resting on the edges of the pan, in a manner which ensures the maximum possible free circulation of air above and below the filter. The filters are affixed to the clips using pins to anchor them. These pan-filter assemblies are oven dried under vacuum at 150° C. for 20 minutes to remove moisture and other volatiles, then weighed to the nearest 0.0001 g for a tare weight. About 0.7 mL of reference solution is weighed to the nearest 0.0001 g and applied to one of filter-pan assemblies. This is repeated for the condensate-resole sample, using the other filter-pan assembly. The filter-pan assemblies so treated with sample and reference are then cured in a recirculating or convection oven at 150° C. for 1 hour. After drying, the filter-pan assemblies are cooled, and reweighed to determine the difference. The filter-pan assemblies are handled using tweezers to minimize contamination.

The resin efficiency results are calculated as follows:

Solids added=20%+0.62 (assuming 3.1% ammonium sulfate was added to the 20% resin solids mix; or a total of 20.62% solids).

Dry weight=Cured weight−tare of filter-pan assembly.

Wet weight=amount applied to the filter-pan assembly wet.

Efficiency rating:

Calculate Final weight/Wet weight

Divide this number by the value obtained in step 1 (20.62 for this example).

For example, a sample of resole resin-condensate composition is prepared at 20% pan solids. To the sample, 3.1% (on solids basis) of ammonium sulfate solution is added. Since 20%×0.031 g=0.62 g, the sample contains 20.62 grams of solid material per 100 grams of solution, based on pan solids.

This solution is then added to the filter medium and weighed by the above technique to give the "wet weight". In the present example, the wet weight is 0.7604 grams. The medium is put in the oven for one hour and then allowed to cool as described above. This weight is the "dry weight". For this example, the dry weight is 0.1613 grams.

The calculation is then done as follows:

(0.1613 g dry wt./0.7604 wet wt.)×100=21.213% effective solids;

(21.213% effective solids/20.62% pan solids)× 100=102.9% efficiency rating.

The variation in the amount of the ammonium sulfate when different amounts of ammonium sulfate are used, is thereby compensated for to ensure an accurate comparison.

Due to the affect of the ammonium sulfate and the total exposed area of the filter medium on both sides, it is possible to obtain efficiency rating values greater than 100%. These values indicate the polymerization of free formaldehyde and phenol rather than the loss of these components as is experienced in an oven solids test upon which these initial resin loads are based.

In an embodiment, a binder composition comprising, a hydroxyaromatic-aldehyde resole resin modified with urea-aldehyde condensate demonstrates a resin efficiency of greater than or equal to 105%, specifically greater than or equal to 106%, more specifically greater than or equal to 107%, and still more specifically greater than or equal to 108%, as determined using the above described resin efficiency test. In a specific embodiment, the hydroxyaromatic-aldehyde resole resin is a phenol-formaldehyde resin and the urea-aldehyde condensate is a urea-formaldehyde condensate.

Thus, in a particularly advantageous feature, the binder compositions have improved premix stability, improved cure efficiency, or both, as well as lower raw materials costs. The binder compositions may also be used to manufacture products that maintain their desirable physical properties such as color, tensile strength, moisture resistance, compression recovery, and the like.

The following examples are for purposes of illustration and are not intended to limit the scope of the claimed invention.

Preparation of Urea-Formaldehyde Condensate

A urea-formaldehyde concentrate having a formaldehyde:urea mol ratio of 4.98 was prepared by the following procedure: A flask was charged with 2490.0 g of a 50 wt % solution of formaldehyde. The formaldehyde solution was adjusted to a pH of about 8.7 to about 9.2 by addition of about 14.9 g of 50 wt % sodium hydroxide in water, and the temperature of the solution was raised to about 62-66° C. Urea (500.0 g) was then added, and the temperature was slowly raised to about 78° C. to about 82° C., and the temperature of the reaction was maintained at about 80° C. for a hold time of about 30 minutes. During this hold, the pH was checked about every 10 minutes, and was adjusted to maintain a reaction pH of about 7.2 or greater by addition of an effective amount of 25 wt % sodium hydroxide. After the hold time, the reaction was cooled to about 45° C. The reaction was distilled under vacuum, and 1039.0 g of distillate was collected to give a refractive index endpoint for the condensate of 1.469 to 1.472. The solution was cooled to about 45° C. and held for 2 hours, then cooled to 25° C. The amount of free formaldehyde was determined by the sodium sulfite method to be 21.1%, by weight, and the solution had a refractive index of 1.4694.

COMPARATIVE EXAMPLE 1

Preparation of PF Resin (f/p Ratio 4.25)

Phenol-formaldehyde resole (PF resole) resin, for comparison purposes, was prepared using the following components and procedure. Phenol was charged to the reactor and a sufficient quantity of 50% sodium hydroxide to obtain about 10% by weight based on the initial charge of phenol. Formaldehyde was added over 70 minutes in a quantity to obtain a F:P molar ratio of 4.25:1. The exothermic reaction was allowed to condense at 57C to a saltwater tolerance of 220%. The reaction was then rapidly cooled to 25° C. The resin properties are shown in Table 1, below.

EXAMPLE 2

Preparation of Phenol-Formaldehyde Resole Resin Modified with Urea-Formaldehyde Condensate Phenol-formaldehyde resole (PF resole) resin modified with urea-formaldehyde condensate, suitable for use in an insulation binder, was prepared using the following components and procedure. Phenol (600 g, 23.0 wt %) was added to a reaction vessel and mixing was begun. A 50% aqueous sodium hydroxide solution (60 g, 2.3 wt %) was added, to provide 0.1176 moles of catalyst per mole of phenol. The reactor temperature was raised to 60° C. A 50% aqueous solution of formaldehyde (1615 g, 62.0 wt %) was then added over 50 minutes, maintaining a temperature of 62° C. The mixture was allowed to react for a further 90 minutes while maintaining the temperature at 62° C. with vacuum reflux. Urea (31 g, 1.2 wt %) was added to scavenge a small part of the free formaldehyde, to ensure approximately 12.5 wt % free formaldehyde was obtained upon completion of the condensation. Condensation of the formaldehyde and urea was continued while maintaining 62° C. until a 25% solution saltwater tolerance endpoint of 213% was reached. The reaction was cooled to about 40 to 42° C. At the end of this step in the process, the free (or unreacted) formaldehyde concentration was typically between about 11.5% and about 12.5%. Next, 300 g (11.5 wt %) of a urea-formaldehyde condensate composition was added to the reaction, and the temperature was maintained for 30 minutes at 40-42° C., after which time the reaction was cooled to 25° C.

TABLE 1

|  | Example 2 | Comparative Example 1 |
|---|---|---|
| Free Phenol, % | 0.31 | 0.33 |
| Free Formaldehyde, % | 14.1 | 14.3 |
| Solids Content, % | 45.44 | 43.45 |
| Tetradimer Content, % | 8.5 | 11.5 |

EXAMPLE 3

Tetradimer Precipitation Resistance in Phenol-Formaldehyde-Urea Solutions

Samples of phenol-formaldehyde resole (herein referred to as "Comparative Example 3a") and phenol-formaldehyde resole modified with urea-formaldehyde condensate prepared according to Example 2 (herein referred to as "Example 3b") were made to premix solutions in the following manner: To each of these solutions, a 50% solids solution of urea was added to give a final ratio of about 37 wt % added urea to about 63 wt % resin solids, for a total of about 240 g of both the Comparative Example 3a resin mix and the Example 3b resin. Each was mixed until the urea dissolved. Each of these solutions was then seeded with a catalytic amount (0.15 g) of isolated tetradimer, and the solutions were slowly agitated at 75-77° F. (24-25° C.) to simulate a customer's mix tank.

The Comparative Example 3a resin developed a haze after 24 hours agitation and became cloudy after 48 hours agitation. The precipitated material causing the cloudiness was collected and analyzed by FTIR to confirm the presence of tetradimer. By contrast, the Example 3b resin medium was clear after 24 hours but became hazy after 48 hours. Upon collection and FTIR analysis of this smaller amount of precipitate, no tetradimer was found, but the precipitated material was determined to be urea-formaldehyde resin, which was soluble in water and therefore not of significant concern in the manufacturing process relative to tetradimer.

EXAMPLE 4

Dimethylol-Urea Precipitate Formation Resistance

Samples of phenol-formaldehyde resole (herein referred to as "Comparative Example 4a") and phenol-formaldehyde resole modified with urea-formaldehyde condensate prepared according to example 2 (herein referred to as "Example 4b") were made to premix solutions in the following manner: To each of these solutions, a 50% solids solution of urea was added to give a final ratio of about 37 parts added urea to about 63 parts resin solids, and each was pre-reacted with the urea for 7 hours at 75° F. (24° C.). The solutions were slowly agitated at 47° F. (8° C.) to accelerate any precipitation that might occur.

The control-urea solution became cloudy after 15 hours agitation and attained a milky appearance after 18 hours agitation. The precipitated material causing the cloudiness was collected and analyzed by FTIR to confirm the presence of dimethylolurea. By contrast, the Example 2—urea solution remained clear under storage conditions until 135 hours, when a cloudiness became apparent. Upon collection and FTIR analysis of this smaller amount of precipitate, the precipitated material was determined to be dimethylolurea.

EXAMPLE 5

Emission of Volatile Components

Samples of phenol-formaldehyde control (herein referred to as "control") and phenol-formaldehyde modified with urea-formaldehyde condensate prepared according to example 2 (herein referred to as "Example 2") were made to premix solutions in the following manner: To each of these solutions, a 50% solids solution of urea was added to give a final ratio of about 37 wt % added urea to about 63 wt % resin solids, and each was pre-reacted with the urea for about 16-20 hours at 75° F. (24° C.). From each of these solutions, a binder mix was prepared by adding 3.1 wt % to one set (Example 5a, comparative Example 5b) and 3.5 wt % of solids of ammonium sulfate to the other set (Example 5c, comparative Example 5d). Each set of these solutions was then diluted to 20% solids by addition of water. The results of the tube furnace volatiles analysis are shown in table 2 below:

TABLE 2

|  | Example 5a | Comparative Example 5b | Example 5c | Comparative Example 5d |
|---|---|---|---|---|
| $(NH_4)_2SO_4$ added (wt % of solids) | 3.1 | 3.1 | 3.5 | 3.5 |
| PHENOL, ppm | 969 | 1302 | 889 | 1368 |
| FORMALDEHYDE, ppm | 883 | 3741 | 537 | 624 |

As detailed here, Example 5a resulted in a 76% decrease in formaldehyde emissions and a 26% decrease in phenol emissions, relative to the control Example 5b when the amount of ammonium sulfate used was 3.1 wt % of solids. Example 5c resulted in a 14% decrease in formaldehyde emissions and a 35% decrease in phenol emissions, relative to the control Example 5d when the amount of ammonium sulfate used was 3.5 wt % of solids.

EXAMPLE 6

Tensile Strength Comparison of Binder Mixes

Binder solution was prepared at 20% solids using ammonium sulfate at about 3.1 and about 3.5 wt % of solids, and about 63:37 weight ratio of resin solids to urea solids from the urea solution. Testing fibers (glass) of about 1 inch in length and containing about 15.2% moisture by weight were weighed into a beaker to a total fiber mass of 7.7 g. Four to six drops of a dispersant were added. The contents were added to a hopper with sufficient water and approximately one quart of thickener, and blended for about 2 minutes. Glass mat was prepared from this mixture by dropping the hopper contents onto a screened surface through which the bulk of the water and thickener pass freely, leaving the coated glass fibers on the screened surface. This mat was vacuum stripped by passing over a sieved table to remove all but a very small amount of the remaining water and thickener. The binder solution was then applied thoroughly and evenly using a quart jar with perforated lid, and the mat was subsequently vacuum stripped by passing over a sieved table at a linear velocity such that a target of 16% resin load remains on the mat post curing. The mat, now about 11×11 inches (27.94×27.94 cm) square, was cured in an oven, preferably with uniform heating capability and good heat control, at 400° F. (204° C.) for 90 seconds. The cured mat was cut into strips of about 1 inch width for testing.

For dry tensile strength, the mat strips are mounted in the jaws of the tensile strength tester and evaluated according to the T 404 TAPPI method. For wet tensile strength, the test strip cut from the mat as described above was soaked in water at 60° C. for 1 hour, and tested immediately while still hot. The cure temperature and cure time can be varied, with typical temperatures and cure time of from about 3.0 minutes at 350° F. (177° C.) to about 1.5 minutes at 400° F. (204° C.).

Comparison of the tensile strengths of the binder mixes from example 5 (referred to as Comparative Examples 5b and 5d, and Examples 5a and 5c (as described above, respectively) were performed to assess any differences between the compositions. The tensile strength samples were prepared by application of the individual binder mixes to glass mat at about 16% binder resin load, applied using 20% solids solutions with about 3.1 and about 3.5% added ammonium sulfate and cured at 400° F. (204° C.) for 90 seconds to give the results shown in table 3, below. Results of wet and dry tensile strength testing for resole resin-urea formaldehyde condensate and from comparative resole resin examples.

TABLE 3

|  | Example 5a | Comparative Example 5b | Example 5c | Comparative Example 5d |
|---|---|---|---|---|
| $(NH_4)_2SO_4$ added (wt % of solids) | 3.1 | 3.1 | 3.5 | 3.5 |
| DRY TENSILE, pounds | 50.8 | 44.9 | 50.4 | 50.5 |
| WET TENSILE, pounds | 36.0 | 33.7 | 39.0 | 41.0 |

It may be noted that no detrimental effects were seen in the strength of the binder prepared with the urea-formaldehyde condensate composition at the 3.5 wt % ammonium sulfate level (Example 5c) and an improvement is noted at the 3.1 wt % ammonium sulfate level (Example 5a), relative to their respective comparative examples.

EXAMPLE 7

Preparation of Modified PF Resin (Initial Formaldehyde to Phenol Mol Ratio 4.215; Final f/p 5.156)

Phenol-formaldehyde resole (PF resole) resin modified with urea-formaldehyde condensate, suitable for use in an insulation binder, may be prepared using the following components and procedure. Phenol (1019 g, 22.7 wt %) and water (77.4 g) were added to a reaction vessel and mixing was begun. A 50% aqueous sodium hydroxide solution (101.9 g, 2.3 wt %; pbw 10.0 parts based on phenol) was added, to provide 0.1176 moles of catalyst per mole of phenol. The reactor temperature was raised to 60-62° C. A 50% aqueous solution of formaldehyde (2741 g, 60.9 wt %) was then added over 70 minutes, maintaining a temperature of 60-62° C. The mixture was allowed to react for a further 90 minutes while maintaining the temperature at 60-62° C. with vacuum reflux. Urea (50.9 g, 1.12 wt %; 5 pbw based on phenol) was added to scavenge a small part of the free formaldehyde, to ensure approximately 11 wt % free formaldehyde was obtained upon completion of the condensation. Condensation of the formaldehyde and urea was continued while maintaining 62° C. until a 25% solution saltwater tolerance endpoint of 220% was reached. The reaction was cooled to about 40° C. At the end of this step in the process, the free (or unreacted) formaldehyde concentration was typically between about 11.5% and about 12.5%. Next, 509.5 g (11.3 wt %; 50 pbw based on phenol) of a urea-formaldehyde condensate composition was added to the reaction, and the temperature was maintained for 30 minutes at 38-40° C., after which time the reaction was cooled to 25° C. The free formaldehyde content of the modified resin was 13.0 wt % of solution, adjusted to 14.35 wt % by addition of 75 g of 50 wt % formaldehyde solution. The resin properties are as follows (Table 4).

TABLE 4

| Resin Properties | Example 7 |
|---|---|
| Free Phenol, wt % of solution | 0.3 |
| Free Formaldehyde, wt % of solution | 14.35 |
| Solids Content, % | 44.1 |

EXAMPLE 8

Preparation of Modified PF Resin (Initial f/p Ratio 3.604 Final f/p Ratio 4.544)

Phenol-formaldehyde resole (PF resole) resin modified with urea-formaldehyde condensate, suitable for use in an insulation binder, may be prepared using the following components and procedure. Phenol (1125 g, 25 wt %) was added to a reaction vessel and mixing was begun. A 50% aqueous sodium hydroxide solution (157 g, 3.5 wt %; 14 pbw based on phenol) was added, to provide 0.165 moles of catalyst per mole of phenol. The reactor temperature was raised to 60-62° C. A 50% aqueous solution of formaldehyde (2,587.5 g, 57.5 wt %) was then added over 70 minutes, maintaining a temperature of 60-62° C. The mixture was allowed to react for a further 90 minutes while maintaining the temperature at 60-62° C. with vacuum reflux. Urea (67.5 g, 1.5 wt %; 6 pbw based on phenol) was added to scavenge a small part of the free formaldehyde, to ensure approximately 8.25 wt % free formaldehyde was obtained upon completion of the condensation. Condensation of the formaldehyde and urea was continued while maintaining 62° C. until a 25% solution saltwater tolerance endpoint of 240-250% was reached. The reaction was cooled to about 40° C. At the end of this step in the process, the free (or unreacted) formaldehyde concentration was typically between about 8.0% and about 8.5%. Next, 562.5 g (12.5 wt %; 50 pbw based on phenol) of a urea-formaldehyde condensate composition was added to the reaction, and the temperature was maintained for 30 minutes at 38-40° C., after which time the reaction was cooled to 25° C. The resin properties are as follows (Table 5).

TABLE 5

| Resin properties | Example 8 |
|---|---|
| Free Phenol, wt % of solution | 0.36 |
| Free Formaldehyde, wt % of solution | 10.6 |
| Solids Content, % | 50.1 |

EXAMPLE 9

Preparation of Modified PF Resin (Initial f/P Ratio 3.667 Final f/p Ratio 4.544)

Phenol-formaldehyde resole (PF resole) resin modified with urea-formaldehyde condensate, suitable for use in an insulation binder, may be prepared using the following components and procedure. Phenol (562.5 g, 25 wt %) was added to a reaction vessel and mixing was begun. A 50% aqueous sodium hydroxide solution (78.8 g, 3.5 wt %; 14 pbw based on phenol) was added, to provide 0.165 moles of catalyst per mole of phenol. The reactor temperature was raised to 60-62° C. A 50% aqueous solution of formaldehyde (1,293.8 g, 57.5 wt %) was then added over 70 minutes, maintaining a temperature of 60-62° C. The mixture was allowed to react for a further 90 minutes while maintaining the temperature at 60-62° C. with vacuum reflux. Urea (33.8 g, 1.5 wt %; 6 pbw based on phenol) was added to scavenge a small part of the free formaldehyde, to ensure approximately 8.25 wt % free formaldehyde was obtained upon completion of the condensation. Condensation was continued while maintaining 62° C. until a 25% solution saltwater tolerance endpoint of 300% was reached. The reaction was cooled to about 40° C. At the end of this step in the process, the free (or unreacted) formaldehyde concentration was typically between about 8.0% and about 8.5%. Next, 281.3 g (12.5 wt %; 50 pbw based on phenol) of a urea-formaldehyde condensate composition was added to the reaction, and the temperature was maintained for 30 minutes at 38-40° C., after which time the reaction was cooled to 25° C. The resin properties are as follows (Table 6).

TABLE 6

| Resin properties | Example 9 |
| --- | --- |
| Free Phenol, wt % of solution | 0.45 |
| Free Formaldehyde, wt % of solution | 10.4 |
| Solids Content, % | 49.6 |

EXAMPLE 10

Preparation of Modified PF Resin (Initial f/p Ratio 3.604 Final f/p Ratio 4.544)

Phenol-formaldehyde resole (PF resole) resin modified with urea-formaldehyde condensate, suitable for use in an insulation binder, may be prepared using the following components and procedure. Phenol (113.6 Kg, 25 wt %) was added to a reaction vessel and mixing was begun. A 50% aqueous sodium hydroxide solution (15.9 Kg, 3.5 wt %; 14 pbw based on phenol) was added, to provide 0.165 moles of catalyst per mole of phenol. The reactor temperature was raised to 55-57° C. A 50% aqueous solution of formaldehyde (261.3 Kg, 57.5 wt %) was then added over 70 minutes, maintaining a temperature of 55-57° C. The mixture was allowed to react for a further 90 minutes while maintaining the temperature at 55-57° C. with vacuum reflux. Urea (6.8 Kg, 1.5 wt %; 6 pbw based on phenol) was added to scavenge a small part of the free formaldehyde, to ensure approximately 8.5 wt % free formaldehyde was obtained upon completion of the condensation. Condensation of the formaldehyde and urea was continued while maintaining 55-57° C. until a 25% solution saltwater tolerance endpoint of 290% was reached. The reaction was cooled to about 40° C. At the end of this step in the process, the free (i.e., unreacted) formaldehyde concentration was typically between about 8.5% and about 9.0%. Next, 56.8 Kg (12.5 wt %; 50 pbw based on phenol) of a urea-formaldehyde condensate composition was added to the reaction, and the temperature was maintained for 50 minutes at 35-40° C., after which time the reaction was cooled to 30-35° C. The resin properties are as follows (Table 7).

TABLE 7

| Resin properties | Example 10 |
| --- | --- |
| Free Phenol, wt % of solution | 0.44 |
| Free Formaldehyde, wt % of solution | 10.6 |
| Solids Content, % | 49.9 |

EXAMPLE 11

Preparation of Modified PF Resin (Initial Formaldehyde to Phenol Mol Ratio 4.215; Final f/p 5.156)

Phenol-formaldehyde resole (PF resole) resin modified with urea-formaldehyde condensate, suitable for use in an insulation binder, may be prepared using the following components and procedure. Phenol (102.7 Kg, 22.6 wt %) and water (3.9 Kg) was added to a reaction vessel and mixing was begun. A 50% aqueous sodium hydroxide solution (7.7 Kg, 2.26 wt %; 10.0 pbw based on phenol) was added, to provide 0.1176 moles of catalyst per mole of phenol. The reactor temperature was raised to 55-57° C. A 50% aqueous solution of formaldehyde (276.7 Kg, 60.9 wt %) was then added over 70 minutes, maintaining a temperature of 55-57° C. The mixture was allowed to react for a further 90 minutes while maintaining the temperature at 55-57° C. with vacuum reflux. Urea (5 Kg, 1.13 wt %; 5 pbw based on phenol) was added to scavenge a small part of the free formaldehyde, to ensure approximately 11 wt % free formaldehyde was obtained upon completion of the condensation. Condensation of the formaldehyde and urea was continued while maintaining 55-57° C. until a 25% solution saltwater tolerance endpoint of 250% was reached. The reaction was cooled to about 40° C. At the end of this step in the process, the free (or unreacted) formaldehyde concentration was typically between about 11.5% and about 12.5%. Next, 51.4 Kg (11.3 wt %; 50 pbw based on phenol) of a urea-formaldehyde condensate composition was added to the reaction, and the temperature was maintained for 30-40 minutes at 38-40° C., after which time the reaction was cooled to 25° C. The resin properties are as follows (Table 8).

TABLE 8

| Resin properties | Example 11 |
| --- | --- |
| Free Phenol, wt % of solution | 0.39 |
| Free Formaldehyde, wt % of solution | 14.2 |
| Solids Content, % | 46.3 |

EXAMPLE 12

Preparation of Modified PF Resin (Initial f/p Ratio 3.667; Final f/p Ratio 4.607)

Phenol-formaldehyde resole (PF resole) resin modified with urea-formaldehyde condensate, suitable for use in an insulation binder, may be prepared using the following components and procedure. Phenol (729.9 g, 24.3 wt %) and water (51.1 g) were added to a reaction vessel and mixing was begun. A 50% aqueous sodium hydroxide solution (102.2 g, 3.4 wt %; 14 pbw based on phenol) was added, to provide 0.165 moles of catalyst per mole of phenol. The reactor temperature was raised to 55-57° C. A 50% aqueous solution of formaldehyde (1708 g, 56.9 wt %) was then added over 70 minutes, maintaining a temperature of 55-57° C. The mixture was allowed to react for a further 120 minutes while maintaining the temperature at 55-57° C. with vacuum reflux. Urea (43.8 g, 1.46 wt %; 6 pbw based on phenol) was added to scavenge a small part of the free formaldehyde, to ensure approximately 8.5 wt % free formaldehyde was obtained upon completion of the condensation. Condensation of the formaldehyde and urea was continued while maintaining 55-57° C. until a 25% solution saltwater tolerance endpoint of 280-290% was reached. The reaction was cooled to about 40° C. At the end of this step in the process, the free (or unreacted) formaldehyde concentration was typically between about 8.0% and about 9.0%. Next, 365 g (12.2 wt %; 50 pbw based on phenol) of a urea-formaldehyde condensate composition was added to the reaction, and the temperature was maintained for 30 minutes at 38-40° C., after which time the reaction was cooled to 25° C. The resin properties are as follows (Table 9).

TABLE 9

| Resin properties | Example 12 |
|---|---|
| Free Phenol, wt % of solution | 0.37 |
| Free Formaldehyde, wt % of solution | 10.7 |
| Solids (%) | 48.1 |
| Tetradimer, % | 12.4 |
| Molecular Weight | 250 |

EXAMPLE 13

Preparation of Modified PF Resin (Initial f/p Ratio 3.75; Final f/p Ratio 4.69)

Phenol-formaldehyde resole (PF resole) resin modified with urea-formaldehyde condensate, suitable for use in an insulation binder, may be prepared using the following components and procedure. Phenol (480.2 g, 24.0 wt %) and water (33.6 g) were added to a reaction vessel and mixing was begun. A 50% aqueous sodium hydroxide solution (67.2 g, 3.4 wt %; 14 pbw based on phenol) was added, to provide 0.165 moles of catalyst per mole of phenol. The reactor temperature was raised to 60-62° C. A 50% aqueous solution of formaldehyde (1150 g, 57.5 wt %) was then added over 70 minutes, maintaining a temperature of 60-62° C. The mixture was allowed to react for a further 120 minutes while maintaining the temperature at 60-62° C. with vacuum reflux. The reaction was cooled to 55-57° C., and urea (28.8 g, 1.44 wt %; 6 pbw based on phenol) was added to scavenge a small part of the free formaldehyde, to ensure approximately 8.5 wt % free formaldehyde was obtained upon completion of the condensation. Condensation of the formaldehyde and urea was continued while maintaining 55-57° C. until a 25% solution saltwater tolerance endpoint of 280% was reached. The reaction was cooled to about 40° C. At the end of this step in the process, the free (or unreacted) formaldehyde concentration was typically between about 8.25% and about 9.00%. Next, 240 g (12.00 wt %; 50 pbw based on phenol) of a urea-formaldehyde condensate composition was added to the reaction, and the temperature was maintained for 30 minutes at 35-40° C., after which time the reaction was cooled to 30-35° C. The resin properties are as follows (Table 10).

TABLE 10

| Resin properties | Example 13 |
|---|---|
| Free Phenol, wt % of solution | 0.34 |
| Free Formaldehyde, wt % of solution | 10.7 |
| Solids (%) | 47.9 |

EXAMPLE 14

Preparation of Modified PF Resin (Initial f/p Ratio 3.01; Final f/p Ratio 3.949)

Phenol-formaldehyde resole (PF resole) resin modified with urea-formaldehyde condensate, suitable for use in an insulation binder, may be prepared using the following components and procedure. Phenol (542 g, 27.1 wt %) and water (37.9 g) were added to a reaction vessel and mixing was begun. A 50% aqueous sodium hydroxide solution (76 g, 3.8 wt %; 14 pbw based on phenol) was added, to provide 0.165 moles of catalyst per mole of phenol. The reactor temperature was raised to 60-62° C. A 50% aqueous solution of formaldehyde (1041 g, 52.0 wt %) was then added over 70 minutes, maintaining a temperature of 60-62° C. The mixture was allowed to react for a further 120 minutes while maintaining the temperature at 60-62° C. with vacuum reflux. The reaction was cooled to 55-57° C., and urea (32.5 g, 1.6 wt %; 6 pbw based on phenol) was added to scavenge a small part of the free formaldehyde, to ensure approximately 5.0 wt % free formaldehyde was obtained upon completion of the condensation. Condensation of the formaldehyde and urea was continued while maintaining 55-57° C. until a 25% solution saltwater tolerance endpoint of 300% was reached. The reaction was cooled to about 40° C. At the end of this step in the process, the free (or unreacted) formaldehyde concentration was typically between about 4.5% and about 5.5%. Next, 271 g (13.6 wt %; 50 pbw based on phenol) of a urea-formaldehyde condensate composition was added to the reaction, and the temperature was maintained for 30 minutes at 35-40° C., after which time the reaction was cooled to 30-35° C. The resin properties are as follows (Table 11).

TABLE 11

| Resin properties | Example 14 |
|---|---|
| Free Phenol, wt % of solution | 1.7 |
| Free Formaldehyde, wt % of solution | 8.0 |
| Solids (%) | 50.5 |

EXAMPLE 15

Preparation of Condensate Modified PF Resin with Final f/p of 4.607

A mixture of phenol-formaldehyde resole (PF resole) resins modified with urea-formaldehyde condensate from Examples 10 and 13 was prepared in a 1:1 ratio on liquid basis. The resin properties are as follows (Table 12).

TABLE 12

| Resin properties | Example 15 |
|---|---|
| Free Phenol, wt % of solution | 0.40 |
| Free Formaldehyde, wt % of solution | 10.7 |
| Solids (%) | 48.9 |

EXAMPLE 16

Preparation of Modified PF Resin (Initial f/p Ratio 3.75; Final f/p Ratio 4.69)

Phenol-formaldehyde resole (PF resole) resin modified with urea-formaldehyde condensate, with no urea added prior to the addition of UF concentrate, was prepared using the following components and procedure. Phenol (730.8 g, 24.3 wt %) and water (51.5 g) were added to a reaction vessel and mixing was begun. A 50% aqueous sodium hydroxide solution (102.3 g, 3.4 wt %; 14 pbw based on phenol) was added, to provide 0.165 moles of catalyst per mole of phenol. The reactor temperature was raised to 60-62° C. A 50% aqueous solution of formaldehyde (1750.3 g, 58.3 wt %) was then added over 60-70 minutes, maintaining a temperature of 55-57° C. during the addition. After addition of the formaldehyde was complete, the temperature was raised to 60-62° C. The mixture was allowed to react for a further 120 minutes while maintaining the temperature at 60-62° C. with vacuum reflux. The reaction was then cooled to 55-57° C. Condensation of the formaldehyde and phenol was continued while maintaining 55-57° C., and the 25% solution saltwater tolerance was tested for until an endpoint of 290% was reached. After an additional 10 minute hold, the reaction was cooled to about 40° C. At the end of this step in the process, the free (or unreacted) formaldehyde concentration was typically between about 10.0% and about 11.0%. Next, 365.4 g (12.18 wt %; 50 pbw based on phenol) of a urea-formaldehyde condensate composition was added to the reaction over 15-20 minutes, and the temperature was maintained for 30 minutes at 35-40° C., after which time the reaction was cooled to 30-35° C. The resin properties are as follows (Table 13).

TABLE 13

|  | Example 16 |
| --- | --- |
| Free Phenol, wt % of solution | 0.38 |
| Free Formaldehyde, wt % of solution | 12.65 |
| Solids (%) | 48 |

EXAMPLE 17

Preparation of Modified PF Resin (Initial f/p Ratio 3.75; Final f/p Ratio 4.69)

Phenol-formaldehyde resole (PF resole) resin modified with urea-formaldehyde condensate, and having dicyandiamide substituted for added free urea, was prepared using the following components and procedure. Phenol (500 g, 23.6 wt %) and water (35 g) were added to a reaction vessel and mixing was begun. A 50% aqueous sodium hydroxide solution (70 g, 3.3 wt %; 14 pbw based on phenol) was added, to provide 0.165 moles of catalyst per mole of phenol. The reactor temperature was raised to 55-57° C. A 50% aqueous solution of formaldehyde (1197.5 g, 56.6 wt %) was then added over 60-70 minutes, maintaining a temperature of 55-57° C. The temperature was then raised to 60-62° C., and mixture was allowed to react for a further 120 minutes while maintaining the temperature at 60-62° C. with vacuum reflux. The reaction was cooled to 55-57° C., and dicyandiamide (63 g, 2.98 wt %; 12.6 pbw based on phenol) was added. Condensation was continued while maintaining 55-57° C. until a 25% solution saltwater tolerance endpoint of 290-295% was reached. After an additional 10 minutes, the reaction was cooled to about 40° C. At the end of this step in the process, the free (or unreacted) formaldehyde concentration was typically between about 7.25% and about 8.50%. Next, 250 g (11.8 wt %; 50 pbw based on phenol) of a urea-formaldehyde condensate composition was added to the reaction over 15 to 20 minutes, and the temperature was maintained for 30 minutes at 35-40° C., after which time the reaction was cooled to 25° C. The resin properties are as follows (Table 14).

TABLE 14

| Resin properties | Example 17 |
| --- | --- |
| Free Phenol, wt % of solution | 0.40 |
| Free Formaldehyde, wt % of solution | 11.25 |
| Solids (%) | 49.4 |

A comparison of the free formaldehyde content of the resins prepared by the process of Example 13, wherein free urea is added prior to the UF concentrate, and Example 16, wherein no free urea is added prior to addition of the UF concentrate, shows a reduction of free formaldehyde in Example 13 to 10.7% compared to that of the free formaldehyde of Example 16 at 12.65%. Addition of dicyandiamide in place of urea (using the process of Example 13), as demonstrated in Example 17, also shows a reduction of free formaldehyde in Example 17 to 11.25% compared to that of the free formaldehyde of Example 16 at 12.65%, where no urea or dicyandiamide is added prior to addition of the UF concentrate.

COMPARATIVE EXAMPLE 18A

Preparation of PF Resin (Overall f/p Ratio 3.75)

Phenol-formaldehyde resole (PF resole) resin, for comparison purposes, was prepared using the following components and procedure. Phenol was charged to the reactor and a sufficient quantity of 50% sodium hydroxide to obtain about 14% by weight based on the initial charge of phenol. Formaldehyde was added over 70 minutes in a quantity to obtain a F:P molar ratio of 3.75:1. The exothermic reaction was allowed to condense at 57C to a saltwater tolerance of 270%. The reaction was then rapidly cooled to 25° C.

The resin properties are as follows (Table 15).

TABLE 15

|  | Comparative Example 17a |
| --- | --- |
| Free Phenol, wt % of solution | 0.39 |
| Free Formaldehyde, wt % of solution | 10.8 |
| Solids (%) | 47.8 |
| MW | 334 |
| Tetradimer, % | 16.1 |

EXAMPLE 19

Resin Efficiency Test

The resin efficiency of the resin of the invention prepared in accordance with Example 12 was compared with a standard conventional resole resin binder that is prepared in accordance with the procedure set forth in Comparative Example 18a above and which has a free formaldehyde, free phenol and monomer content comparable to Example 12, but which is prepared without the use of a urea-formaldehyde concentrate in accordance with the instant invention. The efficiency is determined according to the procedure described above.

Resin efficiency was performed with binder compositions prepared as follows. Premixes were prepared from each of Comparative Example 18 and Example 12, using resin and urea in a weight ratio of about 69:31 of solids, and having a solids content for the premix of 46-48 wt % of the solution. The premix was allowed to set at room temperature for 12 hours. Catalyst (ammonium sulfate) was added at about 5.1 and about 5.3 wt % of the resin/urea solids, and the mixture was diluted with water to a final 20 wt % solids solution. The resulting binders for Comparative Example 18 and Example 12 resins were tested according to the procedure above, with binder cure performed at 150° C. for one hour.

Two samples of each of Example 12 and Comparative Example 18 were run and the results are reported below (Table 16):

TABLE 16

|  | Comparative Example 18a | Comparative Example 18a | Example 15 | Example 15 |
|---|---|---|---|---|
| wt % of solids $(NH_4)_2SO_4$ | 5.1 | 5.3 | 4.7 | 5.1 |
| Run 1 | 104.65 | 105.03 | 108.69 | 108.55 |
| Run 2 | 103.98 | 104.99 | 108.66 | 108.32 |
| Avg. | 104.32 | 105.01 | 108.68 | 108.44 |

As seen in the above data, the resin efficiency of the modified resin prepared according to Example 15 is demonstrably higher, with an averaged increase in efficiency of 3.9% compared to the Comparative Example 18 regardless of the amount of ammonium sulfate used in the experiment above.

EXAMPLE 20

Precipitation Resistance

The resin of Example 15 was also compared against the control resole resin prepared in accordance with Comparative Example 18, above, to determine precipitation resistance under the following conditions:

Premixes were prepared from each of Comparative Example 18 and Examples 12 and 13, using resin and urea in a weight ratio of about 69:31 of solids, and having a solids content for the premix of 46-48 wt % of the solution, and the mixture was diluted with water to a final 20 wt % solids. The premix was allowed to mix at room temperature (75° F.) 24° C. for 15-18 hours. Each premix was divided into two portions, and seeded with crystals of tetradimer. One of each pair of samples of seeded premix was stored at (50° F.) 10° C., the other at (75° F.) 24° C., and each was monitored for evidence of precipitation. Each was done under slow agitation.

Precipitated materials were isolated and purified in the following manner, to minimize any loss of precipitate. For premix samples stored at (50° F.) 10° C., the precipitated material was collected on a paper filter, and rinsed with methanol. Methanol is a poor solvent for dimethylol urea, which is the primary precipitate isolated at this temperature. For premix samples stored at (75° F.) 24° C., the precipitated material was collected on a paper filter, and rinsed with water. Water is a poor solvent for tetradimer, which is the primary precipitate isolated at this temperature. The precipitates were analyzed by FTIR to verify their identities. The results are shown in Table 17, below.

TABLE 17

|  | Samples stored at (50° F.) 10° C. (time to formation of precipitate) | Samples stored at (75° F.) 24° C. (time to formation of precipitate[2]) |
|---|---|---|
| Comparative Example 18 (Control) | 1 day[1] | 2 days[2] |
| Example 12 | 7 days[1] | >10 days[3] |
| Example 13 | 4 days[1] | >10 days[3] |

[1]Precipitate identified as dimethylol urea by FTIR.
[2]Precipitate identified as tetradimer by FTIR.
[3]No precipitate formed.

Comparative Example 18, became cloudy after 24 hours at 10° C. FTIR showed the precipitate to be dimethylolurea. Example 12 developed a cloud after 168 hours at 10° C. FTIR showed the precipitate to be dimethylolurea. Example 13 developed a cloud after 96 hours at 10° C. FTIR showed the precipitate to be dimethylolurea. At 25° C., Examples 12 and 13 showed no significant precipitation for eight days beyond the point at which Example 18 showed evidence of a precipitate, and continued to show no significant precipitation for the duration of the test at 25° C.

It was also found the post addition of urea and formaldehyde as separate components to the phenol-formaldehyde resin, not only did not show the same improvement for precipitation resistance, it performed poorly as compared to Comparative Example 18. The additions were made at the same stage of the reaction in which the urea-formaldehyde concentrate is added to the invention and in the identical ratio and amounts of urea and formaldehyde present in the urea-formaldehyde concentrate under the same reaction conditions.

EXAMPLE 21

Tube Furnace Emissions Tests

The emissions were determined by tube furnace emissions testing using Example 15, and were compared to the conventional phenol-formaldehyde resole resin of Comparative Example 18. The tube furnace emission testing was performed as follows.

Emissions testing using a tube furnace was performed using the method described hereinabove, with the following modifications. A piece of Whatman fiberglas measuring (1⅜ by 4 inch) 3.5 cm by 10.2 cm was treated with 20 wt % resin binder solution under 49 torr (28 in. Hg) of vacuum. The temperature was ramped up to (350° F.) 176.7° C. over 5 minutes and then held at that temperature for 15 minutes. The temperature was then decreased to less than about (100° F.) 37.7° C. The emissions data are summarized in Table 18, below.

TABLE 18

|  | Example 15a | Comparative Example 18a | Example 15b | Comparative Example 18b |
|---|---|---|---|---|
| $(NH_4)_2SO_4$ added (wt % of solids) | 4.7 | 5.1 | 5.1 | 5.3 |
| PHENOL, ppm | 622 | 734 | 605 | 736 |
| FORMALDEHYDE, ppm | 251 | 380 | 196 | 213 |

As detailed here, Example 15a resulted in a 34% decrease in formaldehyde emissions and a 15% decrease in phenol emissions, relative to the control Example 18a when the amounts of ammonium sulfate used were about 4.7 wt % and about 5.1 wt % of solids respectively. Example 15b resulted in 48% decrease in formaldehyde emissions and an 18% decrease in phenol emissions, relative to the control Example 18a when the amount of ammonium sulfate used was about 5.1 wt % of solids for both. As also seen in Table 2, the phenol emissions are not as greatly affected by an increase in the amount of ammonium sulfate as are the formaldehyde emissions for the same resin. The ammonium sulfate has to be increased to about 5.3% in order to obtain similar formaldehyde emissions to the invention.

The singular forms "a," "an," and "the" include plural referents unless the context clearly dictates otherwise. The endpoints of all ranges reciting the same characteristic or component are independently combinable and inclusive of the recited endpoint. All references are incorporated herein by reference. Further, the terms "first," "second," and the like herein do not denote any order, quantity, or importance, but rather are used to distinguish one element from another.

It will be understood that while the invention has been described in conjunction with certain embodiments and best mode that are described herein, the foregoing description and examples are merely illustrate. It will be apparent to those skilled in the art that modifications may be made therein without departing from the spirit and the scope of the appended claims.

What is claimed is:

1. A composition comprising a hydroxyaromatic-aldehyde resole resin comprising the reaction product of an aldehyde and a hydroxyaromatic compound, modified with a urea-aldehyde condensate wherein the urea-aldehyde condensate is substantially free of a triazone compound.

2. The composition of claim 1, having an initial aldehyde to hydroxyaromatic compound molar ratio of about 2.0:1 to about 6.0:1 before combining the hydroxyaromatic-aldehyde resole resin with the urea-aldehyde condensate; and a final free formaldehyde content of about 1% to about 18% by weight of solids in the composition after combining, wherein the composition has a solids content of about 45 to about 50%.

3. The composition of claim 2 having an unreacted hydroxyaromatic compound content of less than about 1% by weight of solids in the composition.

4. The composition of claim 1 wherein the hydroxyaromatic-aldehyde resole resin is modified with about 1 to about 40% by weight of solids of a urea-aldehyde condensate.

5. The composition of claim 1 wherein the hydroxyaromatic-aldehyde resole resin is a phenol-formaldehyde resole resin.

6. The composition of claim 1 wherein the urea-aldehyde condensate is a urea-formaldehyde condensate.

7. The composition of claim 1, wherein a premix comprising the composition remains free of visible haze for greater than 36 hours at a temperature of about 9 to about 10° C. and with no precipitate forming for at least 72 hours.

8. The composition of claim 1, wherein a premix comprising the composition remains free of visible haze for greater than about 48 hours at a temperature of about 22° C. to about 27° C.

9. The composition of claim 1, further comprising fibers.

10. The composition of claim 9, wherein the fibers are glass fibers.

11. The composition of claim 9, wherein the composition comprises an insulation product.

12. A method of making modified hydroxyaromatic-aldehyde resole resin, comprising combining a urea-aldehyde condensate, substantially free of a triazone compound, with a hydroxyaromatic-aldehyde resole resin, at a time prior to the use of the modified hydroxyaromatic-aldehyde resole resin in a process for the manufacture of an article therefrom.

13. The method of claim 12, wherein a substituted nitrogen compound is added to the hydroxyaromatic-aldehyde resole resin.

14. The method of claim 12 wherein the urea-aldehyde condensate is urea-formaldehyde condensate, and wherein the hydroxyaromatic-aldehyde resole resin is a phenol-formaldehyde resole resin.

15. The method of claim 13, wherein the substituted nitrogen compound comprises melamine, urea, dicyandiamide, ethyleneurea, propyleneurea, trimethyleneurea, glycouril, or a combination comprising at least one of the foregoing.

16. The method of claim 13, wherein the urea-aldehyde condensate is added to the hydroxyaromatic-aldehyde resole resin after the substituted nitrogen compound has been added to the hydroxyaromatic-aldehyde resole resin.

17. A method of manufacture of an article, comprising contacting a composition comprising a hydroxyaromatic-aldehyde resole resin modified with a urea-aldehyde condensate which is substantially free of a triazone compound, to fibers; and curing the composition.

18. The method of claim 17 wherein the fibers are glass fibers.

19. The method of claim 18 wherein the article is an insulation product.

20. An article comprising fibers and a cured hydroxyaromatic-aldehyde resole resin that has been modified with a urea-aldehyde condensate which condensate is substantially free of a triazone compound.

* * * * *